United States Patent
Yoda et al.

(10) Patent No.: US 9,859,765 B2
(45) Date of Patent: Jan. 2, 2018

(54) WINDING INSULATION STRUCTURE OF STATOR OF ELECTROMAGNETIC MOTOR

(71) Applicant: SANYO DENKI CO., LTD., Tokyo (JP)

(72) Inventors: Kazuhiro Yoda, Tokyo (JP); Masaaki Ohashi, Tokyo (JP); Shogo Yoda, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 71 days.

(21) Appl. No.: 14/445,309

(22) Filed: Jul. 29, 2014

(65) Prior Publication Data

US 2015/0035407 A1 Feb. 5, 2015

(30) Foreign Application Priority Data

Aug. 5, 2013 (JP) .................. 2013-162382

(51) Int. Cl.
| | |
|---|---|
| H02K 3/34 | (2006.01) |
| H02K 3/48 | (2006.01) |
| H02K 1/12 | (2006.01) |
| H02K 1/06 | (2006.01) |
| H02K 3/487 | (2006.01) |
| H02K 3/32 | (2006.01) |

(52) U.S. Cl.
CPC .................. *H02K 3/325* (2013.01)

(58) Field of Classification Search
CPC ....................................... H02K 15/00
USPC ........ 310/214, 215, 254.1, 216.125, 216.126
See application file for complete search history.

(56) References Cited

U.S. PATENT DOCUMENTS 6,188,158 B1 * 2/2001 DeLuca ................. H02K 3/487
                                                    310/214

FOREIGN PATENT DOCUMENTS

| JP | 10271734 A | * | 10/1998 |
|---|---|---|---|
| JP | 2002281707 A | | 9/2002 |
| JP | 2005184994 A | * | 7/2005 |
| JP | 3819989 B2 | | 9/2006 |

* cited by examiner

*Primary Examiner* — Jose Gonzalez Quinones
(74) *Attorney, Agent, or Firm* — Drinker Biddle & Reath LLP

(57) ABSTRACT

A winding insulation structure of a stator of an electromagnetic motor is provided, in which windings are wound inside slots of a stator iron core of the electromagnetic motor formed of a stator and a rotor with an insulation member therebetween, and in which an insulation sheet insertion portion for inserting an insulation sheet is formed between the stator iron core and the insulation member on a slot opening portion side of the stator iron core.

6 Claims, 3 Drawing Sheets

WINDING INSULATION STRUCTURE OF STATOR OF ELECTROMAGNETIC MOTOR

BACKGROUND

1. Technical Field

The present invention relates to improvement of a winding insulation structure of a stator of an electromagnetic motor for securing an electrical insulation distance between a winding that is wound inside the slot of a stator and a stator iron core.

2. Description of Related Art

As an electromagnetic motor, for example, a brushless motor, a stepper motor, and the like are known.

A winding is wound inside the slot of a stator iron core of an electromagnetic motor with an electrical insulation member (hereinafter, simply referred to as "insulation member") therebetween. In order to comply with foreign safety standards (UL, TUV standards, and the like), it is necessary that the windings have an insulation structure to ensure an electrical insulation distance between the winding and the stator iron core.

Since a process of windings the winding uses an automatic winding device, an opening portion of the slot is exposed. Thus, specifically, in a small electromagnetic motor, a creeping distance or a gap distance between the winding and the stator iron core is insufficient. Therefore, as a measure to ensure the electrical insulation distance between the winding and the stator iron core, an electrical insulation sheet (hereinafter, simply referred to as "insulation sheet") is disposed between the winding and the insulation member built into the slot.

However, the insulation member built into the slot does not have a structure that allows the insulation sheet to be inserted therein. Thus, the insulation sheet must be manually placed between the winding and the insulation member and the placement of the insulation sheet requires time.

In the related art, various techniques relating to a winding insulation structure of the stator of the electromagnetic motor are proposed. For example, a winding insulation structure of an electromagnetic motor is disclosed in which the insulation sheet is easily inserted by providing a step in the insulation member so as to form a gap between the insulation member and the stator (see Japanese Patent No. 3819989).

Furthermore, a winding insulation structure of an electromagnetic motor is disclosed in which both end portions of an insulation member extending to a slot opening portion thereof are bent toward the inside of the slot and an insulation distance between a winding and a stator can be secured (see Japanese Unexamined Patent Application Publication No. 2002-281707).

However, in the technique disclosed in Japanese Patent No. 3819989, since the thickness of a portion in which the step for inserting the insulation sheet into the insulation member is provided is small, the insulation member is difficult to mold and is easily broken.

On the other hand, in the technique disclosed in Japanese Unexamined Patent Application Publication No. 2002-281707, it is difficult for the winding to be wound in a portion that is bent toward the inside of the slot and it is difficult to secure an area for the winding. Furthermore, since a winding process of the winding is necessarily performed such that the bent portion does not come into contact with a winding nozzle of the automatic winding device, the winding operation is difficult.

SUMMARY

The present invention is made in view of the above situations and an object of the invention is to provide a winding insulation structure of a stator of an electromagnetic motor for which an operation of winding a winding may be easily performed and securing an electrical insulation distance between the winding and a stator iron core with a simple structure by securing an area for the winding without adversely affecting the molding of the insulation member.

A winding insulation structure of a stator of an electromagnetic motor according to the invention to achieve the above object is configured such that windings are wound inside slots of a stator iron core of the electromagnetic motor formed of a stator and a rotor with insulation members therebetween, an insulation sheet insertion portions for inserting an insulation sheets are formed between the stator iron core and the insulation members on a slot opening portion side of the stator iron core.

According to the winding insulation structure of the stator of the electromagnetic motor of the invention, the insulation sheet insertion portions that accommodate the insulation sheets are formed between the stator iron core and the insulation members on the slot opening portion side of the stator iron core. The insulation sheets are easily inserted and the ease with which the insulation sheet may be inserted is improved by forming the insulation sheet insertion portions between the stator iron core and the insulation members.

Furthermore, since the insulation sheet insertion portions are formed between the stator iron core and the insulation members, the thickness of the insulation members is substantially even and does not adversely affect the molding of the insulation members.

Furthermore, since the insulation sheets are inserted without machining the insulation members, it is possible to secure an area for the windings and also to easily perform the operation of winding the winding.

Moreover, it is possible to secure an electrical insulation distance between the windings and the stator iron core with a simple structure in which the insulation sheet insertion portions are formed between the stator iron core and the insulation members and the insulation sheets are only inserted into the insulation sheet insertion portions.

DETAILED DESCRIPTION

Hereinafter, a winding insulation structure of a stator of an electromagnetic motor according to an embodiment will be described with reference to the drawings.

In the winding insulation structure of the stator of the electromagnetic motor according to the embodiment, an insulation sheet insertion portions for inserting the insulation sheets are formed between a stator iron core and insulation members on a slot opening portion side of the stator iron core. Therefore, according to the embodiment, the winding insulation structure of the stator of the electromagnetic motor can be realized, the structure allowing an operation of winding the winding to be easily performed and an electrical insulation distance between the winding and the stator iron core to be secured with a simple structure by providing an area occupied by the winding without adversely affecting molding of the insulation member.

Figure 1:
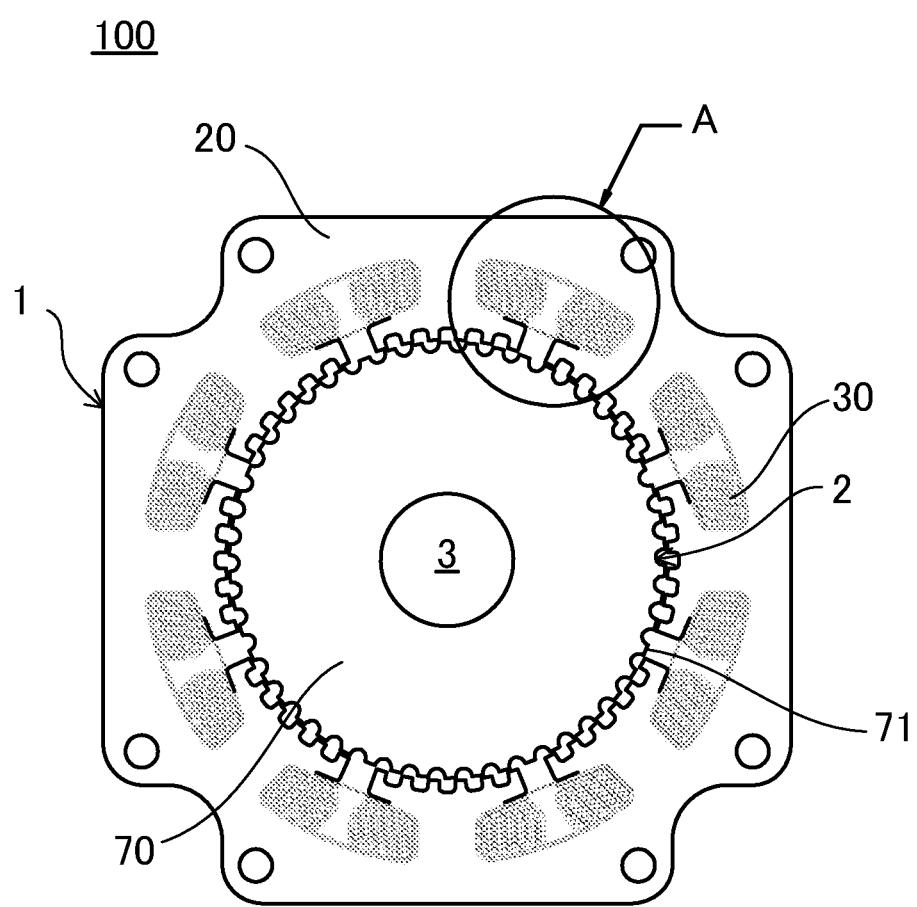
FIG. 1 is a schematic view of an entire configuration of an electromagnetic motor.
Figure 2:
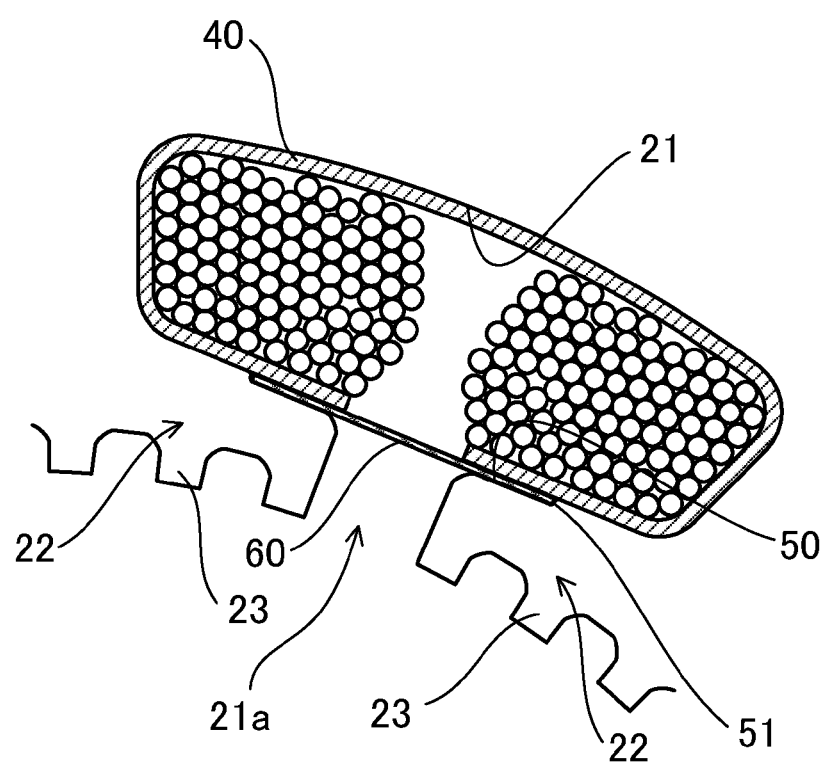
FIG. 2 is an enlarged view of an A portion of a winding structure of the electromagnetic motor of FIG. 1.
Figure 3:
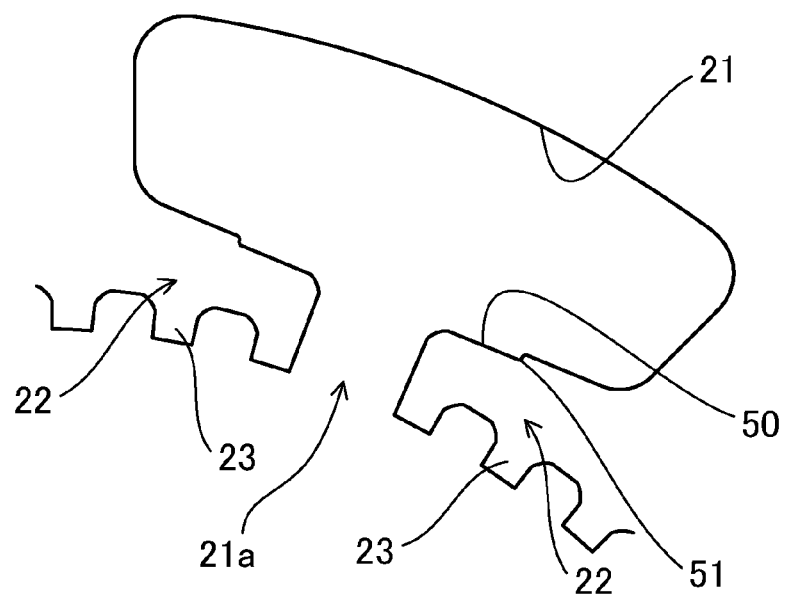
FIG. 3 is an enlarged view of a main portion of a stator iron core of the electromagnetic motor.

Configuration of Winding Insulation Structure of Stator of Electromagnetic Motor First, a configuration of the winding insulation structure of the stator of the electromagnetic motor according to the embodiment will be described with reference to FIGS. 1 to 3. FIG. 1 is a schematic view of an entire configuration of the electromagnetic motor. FIG. 2 is an enlarged view of an A portion of the winding structure of the electromagnetic motor of FIG. 1. FIG. 3 is an enlarged view of a main portion of the stator iron core of the electromagnetic motor.

An electromagnetic motor 100 illustrated in FIG. 1 is a hybrid type (HB type) stepper motor and includes a stator 1 and a rotor 2.

As illustrated in FIG. 1, the stator 1 has a stator iron core 20 and windings 30.

The stator iron core 20 is a thick cylindrical metal member. An inner peripheral surface of the stator iron core 20 has an internal gear shape and an outer peripheral surface thereof has a substantially octagonal shape.

As illustrated in FIGS. 2 and 3, a plurality of slots 21 that serve as spaces for accommodating the windings 30 are radially defined and formed on an inner peripheral side of the stator iron core 20 so as to face the rotor 2.

Each of the slots 21 is defined and formed between teeth 22 and 22. A plurality of gear-shaped small teeth 23 protrude from the inner peripheral surface of each of the teeth 22.

As a constituent material of the stator iron core 20, for example, silicon steel plate is used, but the material is not limited to the example.

The windings 30 are disposed inside the slots 21 with an electrical insulation members disposed therebetween (hereinafter, simply referred to as "insulation member") 40. The numbers of the slot 21 and the windings 30 are equal. In the embodiment, the windings 30 are wound inside eight slots 21, but the number of the slots 21 is not limited.

The insulation members 40 are formed along an inner surface of the slots 21. The insulation members 40 are not mounted in a slot opening portion 21a and have a substantially rectangular C-shape. The insulation members 40 have a substantially even thickness.

As a constituent material of the insulation members 40, for example, synthetic resin such as phenol, nylon, and PBT is exemplified, but the material is not limited to the illustrated constituent material. The dimensions, that is, the thickness, length, or the like, of the insulation members 40 may be appropriately set depending on an area of the inner peripheral surface of the slots 21.

Insulation sheet insertion portions 50 are formed between the stator iron core 20 and the insulation members 40 on the side of the slot opening portions 21a of the stator iron core 20. The insulation sheet insertion portions 50 are gaps that allow insertion of electrical insulation sheets (hereinafter, simply referred to as "insulation sheet") 60.

The insulation sheet insertion portions 50 that accommodate the insulation sheets 60 are each formed by providing step portions 51 in the stator iron core 20 on the side of the slot opening portions 21a of the stator iron core 20.

That is, the insulation sheet insertion portions 50 that are each formed of the step portions 51 in addition to the space taken up by the slot 21 exist on the inner surface on the side of the slot opening portions 21a of the stator iron core 20.

As a configuration material of the insulation sheets 60, for example, synthetic resin sheet of polyester, polyethylene terephthalate, and the like is exemplified, but the material is not limited to the illustrated configuration material. The insulation sheets 60 have a strip shape. The dimensions, that is, thickness, length, and the like, of the insulation sheets 60 are appropriately set in accordance with the opening width and the like of the slot opening portion 21a.

Referring again to FIG. 1, the rotor 2 is provided around a shaft 3 and has a rotor iron core 70 and a permanent magnet (not illustrated). The shaft 3 is a rotational center of the rotor 2.

The rotor iron core 70 of the rotor 2 is a thick cylindrical metal member provided around the shaft 3. A plurality of external gear-shaped small teeth 71 are formed on the outer peripheral surface of the rotor iron core 70. The small teeth 71 are disposed at equal spaces in the circumferential direction of the rotor iron core 70.

As a constituent material of the rotor iron core 70, for example, silicon steel plate is used, but the material is not limited to the example.

The permanent magnet is made up of a thin disk-shaped magnet or the like sandwiched between a pair of rotor iron cores 70 and 70 disposed on either side of the magnet in an axial direction. As the permanent magnet, for example, a rare earth magnet such as a neodymium magnet is exemplified, but the material is not limited to the example.

Operation of Winding Insulation Structure of Stator of Electromagnetic Motor

Next, an operation of the winding insulation structure of stator of the electromagnetic motor according to the embodiment will be described with reference to FIGS. 1 to 3.

The stator 1 for the electromagnetic motor according to the embodiment is provided so as to surround the rotor 2. The stator iron core 20 has a plurality of windings 30 radially arranged to face the rotor 2. The windings 30 are wound inside the slots 21 of the stator iron core 20 with the insulation members 40 therebetween.

As described above, in order to adapt the insulation structure of the windings 30 to foreign safety standards (UL, TUV standards, and the like), the electrical insulation distance between the winding 30 and the stator iron core 20 has to be secured.

After performing the process of winding the windings 30, the slot opening portions 21a are exposed. Therefore, it is necessary to close the slot opening portions 21a by interposing the insulation sheets 60 between the windings 30 and the stator iron core 20. Specifically, in the small electromagnetic motor 100, a creeping distance or a gap distance from the stator iron core 20 has to be secured.

According to the winding insulation structure of the stator of electromagnetic motor of the embodiment, the insulation sheet insertion portions 50 that accommodate the insulation sheets 60 are formed between the stator iron core 20 and the insulation members 40 on the side of the slot opening portions 21a of the stator iron core 20. The insulation sheet insertion portions 50 are formed in the gap between the stator iron core 20 and the insulation members 40 by providing the step portions 51 in the stator iron core 20 on the side of the slot opening portions 21a of the stator iron core 20.

The insulation sheet insertion portions 50 are formed between the stator iron core 20 and the insulation members 40 by the step portions 51 so that the operation for inserting the insulation sheets 60 is easily performed and mounting operation time is shortened compared to the related art.

Furthermore, since the insulation sheet insertion portions 50 are formed by providing the step portions 51 in the stator iron core 20, it is not necessary to machine the insulation members 40. Therefore, the thickness of the insulation members 40 is substantially even and the insulation members 40 are easily molded and not easily broken.

Furthermore, since the structure is configured such that the insulation sheets 60 are inserted without machining the insulation members 40, it is possible to secure an area for the windings and to easily perform the operation of winding the winding.

That is, in the winding insulation structure of the stator of the electromagnetic motor according to the embodiment, the electrical insulation distance between the windings 30 and the stator iron core 20 can be secured with a simple structure in which the insulation sheet insertion portions (gap) 50 are formed between the stator iron core 20 and the insulation members 40 by the step portions 51 and the insulation sheets 60 are inserted into the insulation sheet insertion portions 50.

Preferred embodiments of the invention are described in the above, but the embodiments are examples for describing the invention and they are not intended to limit the range of the invention. It is possible to realize the invention in various aspects different from the embodiments described above without departing from the spirit thereof.

What is claimed is:

1. A winding insulation structure of a stator of an electromagnetic motor,
    wherein windings are wound inside slots of a stator iron core of the electromagnetic motor formed of a stator and a rotor with an insulation member therebetween, and
    wherein an insulation sheet insertion portion for accommodating an insulation sheet is formed between the stator iron core and the insulation member on a slot opening portion side of the stator iron core, and
    wherein the insulation sheet insertion portion is a step portion in the stator iron core on the slot opening portion side of the stator iron core, and wherein the insulation sheet has a uniform thickness and fits into substantially the entire insulation sheet insertion portion.

2. A winding insulation structure of a stator of an electromagnetic motor,
    wherein windings are wound inside slots of a stator iron core of the electromagnetic motor formed of a stator and a rotor with an insulation member therebetween, and
    wherein an insulation sheet insertion portion for accommodating an insulation sheet is formed between the stator iron core and the insulation member on a slot opening portion side of the stator iron core, and
    wherein the insulation sheet insertion portion is a step portion in the stator iron core on the slot opening portion side of the stator iron core and is configured such that the insulation sheet has a uniform thickness and fits into substantially the entire insulation sheet insertion portion.

3. A winding insulation structure of a stator of an electromagnetic motor comprising
    windings wound inside slots of a stator iron core of the electromagnetic motor formed of a stator and a rotor with an insulation member therebetween, and
    an insulation sheet,
    an insulation sheet insertion portion for accommodating the insulation sheet, wherein the insulation sheet insertion portion is a step portion in the stator iron core on the slot opening portion side of the stator iron core and is formed between the stator iron core and the insulation member on a slot opening portion side of the stator iron core, and
    wherein the insulation sheet has a uniform thickness and fits into substantially the entire insulation sheet insertion portion.

4. The winding insulation structure of a stator of an electromagnetic motor according to claim 1, wherein the insulation sheet fills the entire insulation sheet insertion portion.

5. The winding insulation structure of a stator of an electromagnetic motor according to claim 2, wherein the insulation sheet fills the entire insulation sheet insertion portion.

6. The winding insulation structure of a stator of an electromagnetic motor according to claim 3, wherein the insulation sheet fills the entire insulation sheet insertion portion.

* * * * *